US008301606B2

(12) United States Patent
Futatsugi

(10) Patent No.: US 8,301,606 B2
(45) Date of Patent: Oct. 30, 2012

(54) DATA MANAGEMENT METHOD AND APPARATUS

(75) Inventor: Hajime Futatsugi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 210 days.

(21) Appl. No.: 12/688,534

(22) Filed: Jan. 15, 2010

(65) Prior Publication Data
US 2010/0198874 A1 Aug. 5, 2010

(30) Foreign Application Priority Data

Jan. 30, 2009 (JP) ................................. 2009-020739

(51) Int. Cl.
G06F 17/30 (2006.01)
(52) U.S. Cl. ....................................................... 707/694
(58) Field of Classification Search ................... 707/694
See application file for complete search history.

(56) References Cited

U.S. PATENT DOCUMENTS

| 5,185,885 | A  | * | 2/1993  | Dysart et al. ................. 707/822 |
| 5,966,072 | A  | * | 10/1999 | Stanfill et al. ................. 340/440 |
| 6,088,694 | A  | * | 7/2000  | Burns et al. ........................... 1/1 |
| 6,654,761 | B2 | * | 11/2003 | Tenev et al. ........................... 1/1 |
| 6,976,039 | B2 | * | 12/2005 | Chefalas et al. ....................... 1/1 |
| 7,016,920 | B2 | * | 3/2006  | Mastrianni et al. ................... 1/1 |
| 7,197,516 | B1 | * | 3/2007  | Hipp et al. ............................ 1/1 |
| 7,320,007 | B1 | * | 1/2008  | Chang ............................. 715/700 |
| 7,330,281 | B2 | * | 2/2008  | Ferlitsch ...................... 358/1.13 |
| 7,383,286 | B2 | * | 6/2008  | Hamanaka et al. ............ 707/694 |
| 7,546,305 | B2 | * | 6/2009  | Sathyanarayan ..................... 1/1 |
| 7,657,769 | B2 | * | 2/2010  | Marcy et al. .................. 713/375 |
| 7,672,934 | B1 | * | 3/2010  | Beatty et al. ............ 707/999.003 |
| 7,725,507 | B1 | * | 5/2010  | van Rietschote et al. ..... 707/828 |
| 7,822,773 | B2 | * | 10/2010 | Ayars ............................ 707/790 |
| 7,877,424 | B2 | * | 1/2011  | Havewala et al. ............. 707/826 |
| 7,991,957 | B2 | * | 8/2011  | Mercer ......................... 711/118 |
| 2003/0009484 | A1 | * | 1/2003 | Hamanaka et al. ........... 707/200 |

(Continued)

FOREIGN PATENT DOCUMENTS

JP 11134233 A 5/1999

OTHER PUBLICATIONS

U.S. Appl. No. 12/700,657, filed Feb. 4, 2010, by Hajime Futatsugi, Tsutomu Inose, Hidenori Ishiwata, Fumiaki Itoh, Hiroyuki Nagal and Tomoyuki Shimizu.

(Continued)

Primary Examiner — Mark Andrew X Radtke
(74) Attorney, Agent, or Firm — Fitzpatrick, Cella, Harper & Scinto

(57) ABSTRACT

In a data management method using a hierarchical folder structure where an item such as data or a folder can be registered in multiple folders, attribute information is appended to each relational data piece that represents a pair of a child item that is either data or a folder registered in a folder and a parent folder in which the child item has been registered. This attribute information is referred to when a single child item has been registered in multiple parent folders, in order to select one of the multiple parent folders. By selecting a relational data piece based on the attribute information so that each child item can be registered in a single parent folder, at least part of the hierarchical folder structure is converted into a tree structure where a single child item belongs to a single folder.

11 Claims, 14 Drawing Sheets

U.S. PATENT DOCUMENTS

| | | | |
|---|---|---|---|
| 2004/0255179 A1* | 12/2004 | Mayer | 714/1 |
| 2005/0052664 A1* | 3/2005 | Ferlitsch | 358/1.6 |
| 2005/0091310 A1* | 4/2005 | Salomon | 709/203 |
| 2007/0073638 A1* | 3/2007 | McVeigh et al. | 707/1 |
| 2008/0235300 A1* | 9/2008 | Nemoto et al. | 707/204 |
| 2009/0112812 A1* | 4/2009 | Ellis et al. | 707/3 |
| 2009/0150531 A1* | 6/2009 | Hara et al. | 709/222 |
| 2009/0193010 A1* | 7/2009 | Ayars | 707/5 |
| 2009/0307276 A1* | 12/2009 | Dolan et al. | 707/202 |
| 2010/0070448 A1* | 3/2010 | Omoigui | 706/47 |
| 2011/0191291 A2* | 8/2011 | Balakrishnan et al. | 707/618 |

OTHER PUBLICATIONS

Samba.org, "What is Samba?", <URL:http://www.samba.org/samba/what_is_samba.html>, May 24, 2005.

Samba Users Group Japan, "What is Samba?" <URL:http://wiki.samba.gr.jp/mediawiki/index.php/Samba%E3%81%A8%E3%81%AF/>, Feb. 18, 2009.

* cited by examiner

FIG. 7

ITEM

| ITEM IDENTIFIER | ID0001 | ID0002 | ID0003 | ID0004 | ID0005 |
|---|---|---|---|---|---|
| ITEM TYPE | FOLDER | FOLDER | FOLDER | FOLDER | FOLDER |
| ITEM NAME | HEADQUARTERS | PO MANAGEMENT | PURCHASING | COST | DIVISION 1 |
| DATA ENTITY | | | | | |

| ITEM IDENTIFIER | ID0006 | ID0007 | ID0008 | ID0009 |
|---|---|---|---|---|
| ITEM TYPE | FOLDER | FOLDER | DOCUMENT | DOCUMENT |
| ITEM NAME | YEAR 2008 | UNDECIDED | ESTIMATE SHEET | DECISION SHEET |
| DATA ENTITY | | | ... | ... |

RELATIONAL DATA

| PARENT FOLDER IDENTIFIER | ID0001 | ID0002 | ID0004 | ID0004 | ID0004 |
|---|---|---|---|---|---|
| CHILD ITEM IDENTIFIER | ID0002 | ID0003 | ID0005 | ID0006 | ID0007 |
| REGISTRATION DATE AND TIME | 2007/1/1 | 2007/1/1 | 2007/1/1 | 2008/1/1 | 2008/3/10 |

| PARENT FOLDER IDENTIFIER | ID0005 | ID0003 | ID0005 | ID0006 | ID0007 |
|---|---|---|---|---|---|
| CHILD ITEM IDENTIFIER | ID0007 | ID0008 | ID0008 | ID0008 | ID0009 |
| REGISTRATION DATE AND TIME | 2008/3/1 | 2008/2/1 | 2008/3/1 | 2008/3/1 | 2008/3/20 |

706

RELATIONAL ATTRIBUTE DATA

| PARENT FOLDER IDENTIFIER | ID0001 | ID0004 | ID0004 | ID0005 | ID0005 | ID0006 | ID0004 |
|---|---|---|---|---|---|---|---|
| CHILD ITEM IDENTIFIER | ID0004 | ID0005 | ID0006 | ID0007 | ID0008 | ID0008 | ID0007 |
| USER IDENTIFIER | User_01 | User_01 | User_01 | User_01 | User_01 | User_01 | User_01 |
| ACCESS COUNTER | 30 | 20 | 10 | 15 | 5 | 10 | 1 |

707

DATA MANAGEMENT METHOD AND APPARATUS

BACKGROUND OF THE INVENTION

1. Field of the Invention

The present invention relates to data management using a folder hierarchy.

2. Description of the Related Art

One data management method that is popularly used is a method for classifying data into folders. Such a method embodies a user-desired data classification system in a hierarchical folder structure where data is registered in one folder, which is then registered in another folder. Methods for building such a hierarchical folder structure are broadly divided into two categories: those where data and a folder can be registered in only a single folder (hereinafter referred to as a tree structure) and those where data and a folder can be registered in multiple folders (hereinafter referred to as a non-tree structure). Examples of conventional techniques using a tree structure include Microsoft Windows® FAT (file allocation table) and NTFS (New Technology File System). Examples of conventional techniques using a non-tree structure include a method for sharing a single folder among multiple folders (Japanese Patent Laid-open No. 11-134233) and links in a Unix® file system.

In a mixed environment of such a system using a non-tree structure and such a system using a tree structure, the hierarchical folder structure of the former system needs to be converted into a tree structure at the time of exporting data from the former to the latter. Conventional techniques for such conversion include those used by Samba, which is a software suite used to export data from Unix® to Windows® (cf., Samba org., "What Is Samba?" [online], retrieved from the Internet:<URL: http://www.samba.org/>; and Samba Users Group Japan, "What Is Samba?" [online], retrieved from the Internet: <URL: http://wiki.samba.gr.jp/mediawiki/index-.php/Samba % E3%81% A8% E3%81% AF/>).

However, there are, for example, the following problems with the use of such conventional techniques at the time of exporting folders from a non-tree-structure system to a tree-structure system:

the possibility of copying duplicate data that has been registered in multiple folders to every registration target folder; and the inability to export a folder that has been registered in multiple folders.

SUMMARY OF THE INVENTION

The present invention has been made in view of the above-described problems, and according to one embodiment, the present invention provides a data management method and apparatus that provide a suitable mechanism to convert an item in the form of a hierarchical folder structure (non-tree structure) where a single item can belong to multiple parent folders, into an item in the form of another hierarchical folder structure (tree structure) where a single item can belong to only a single parent folder.

According to one aspect of the present invention, there is provided a data management method for converting an item in a first hierarchical folder structure into an item in a second hierarchical folder structure, the first hierarchical folder structure being such that a single item that is either data or a folder is registered in either a single or plural folders, the second hierarchical folder structure being such that a single item is registered in a single folder, the method comprising:

a relational data acquiring step of acquiring, in the first hierarchical folder structure, a plurality of relational data pieces between a plurality of items and parent folders in which the items have been registered;

an attribute appending step of appending attribute information to each of the acquired relational data pieces;

a selection step of, when one of the items is included in plural ones of the relational data pieces, selecting one of the plural ones of the relational data pieces based on the attribute information; and a conversion step of converting an item included in the selected relational data piece into an item in the second hierarchical folder structure so that the converted item is registered in a single parent folder included in the selected relational data piece.

Also, according to another aspect of the present invention, there is provided a data management apparatus using a first hierarchical folder structure and a second hierarchical folder structure, the first hierarchical folder structure being such that a single item that is either data or a folder is registered in either a single or a plurality of folders, the second hierarchical folder structure being such that a single item is registered in a single folder, the apparatus comprising, in the first hierarchical folder structure:

a relational data acquiring unit configured to acquire a plurality of relational data pieces between a plurality of items and parent folders in which the items have been registered;

an attribute appending unit configured to append attribute information to each of the acquired relational data pieces;

a selection unit configured to select one of plural ones of the relational data pieces based on the attribute information when one of the items is included in the plurality of relational data pieces; and a conversion unit configured to convert an item that is included in the selected relational data piece into an item in the second folder hierarchy structure so that the item is registered in a single parent folder that is included in the selected relational data piece.

Further features of the present invention will become apparent from the following description of exemplary embodiments with reference to the attached drawings.

BRIEF DESCRIPTION OF THE DRAWINGS

FIG. 7 is a diagram illustrating examples of items, relational data, and relational attribute data for use in the hierarchical folder structure illustrated in FIG. 6.

DESCRIPTION OF THE EMBODIMENTS

First Embodiment

A first embodiment that implements the present invention will now be described with reference to the drawings.

Figure 1:
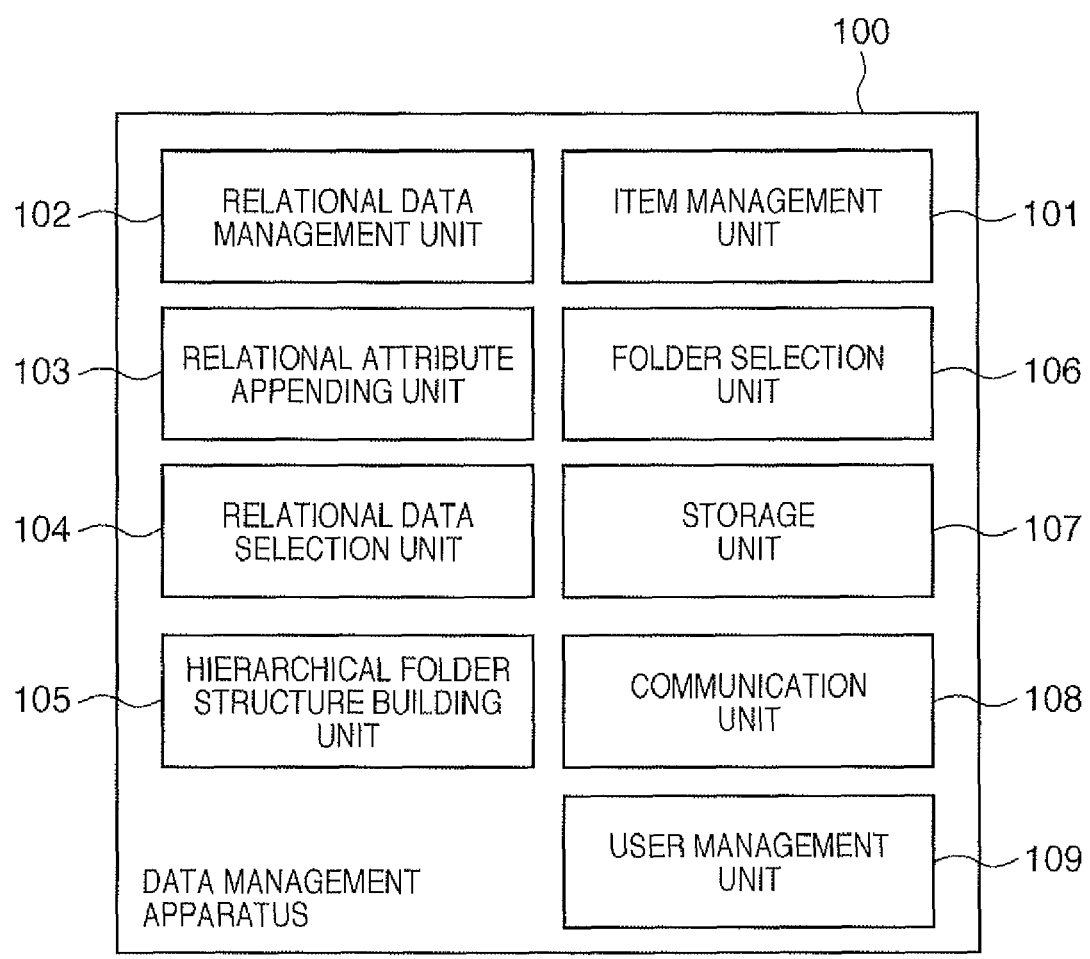
FIG. 1 is block diagram illustrating an example of a module configuration of a data management apparatus according to a first embodiment.

FIG. 1 is a modular block diagram of a data management apparatus 100 according to the present embodiment. An item management unit 101 has the function of storing items, such as user-created documents or folders, into a storage unit 107 as well as acquiring such items from the storage unit 107 in response to a user requirement. A relational data management unit 102 generates relational data pieces (which will be described later with reference to FIGS. 3A to 3C) that are used to manage relationships between folders and items at the time the items in the folders are registered, and stores those data pieces into the storage unit 107. When opening a folder, the relation data management unit 102 acquires relational data pieces relevant to the folder from the storage unit 107. A relational attribute appending unit 103 appends relational attribute data pieces (which will be described later with reference to FIGS. 3A to 3C) to relational data pieces generated by the relational data management unit 102, thereby updating relational data pieces. In other words, the relational attribute appending unit 103 serves as an attribute management unit that manages relational attributes or attribute information that correspond to relational data pieces managed by the relational data management unit 102. This attribute information is referred to when applying items to a tree-structure system, in order to select one of multiple parent folders in the case where a single child item belongs to multiple parent folders. As a result, in the tree structure, the above child item is configured to belong to the selected one of the parent folders, that is, a single parent folder. A relational data selection unit 104 selects relational data pieces based on relational attribute data pieces, at the time of exporting items to a tree-structure file system. A hierarchical folder structure building unit 105 builds a hierarchical structure (a hierarchical folder structure where items such as data or folders can be registered in multiple folders) that is presented to a user based on the relational data pieces registered in the storage unit 107. A folder selection unit 106 selects a folder to be manipulated. A communication unit 108 transmits and receives data to and from an external data management apparatus. A user management unit 109 manages users who access the data management apparatus 100.

Figure 2:
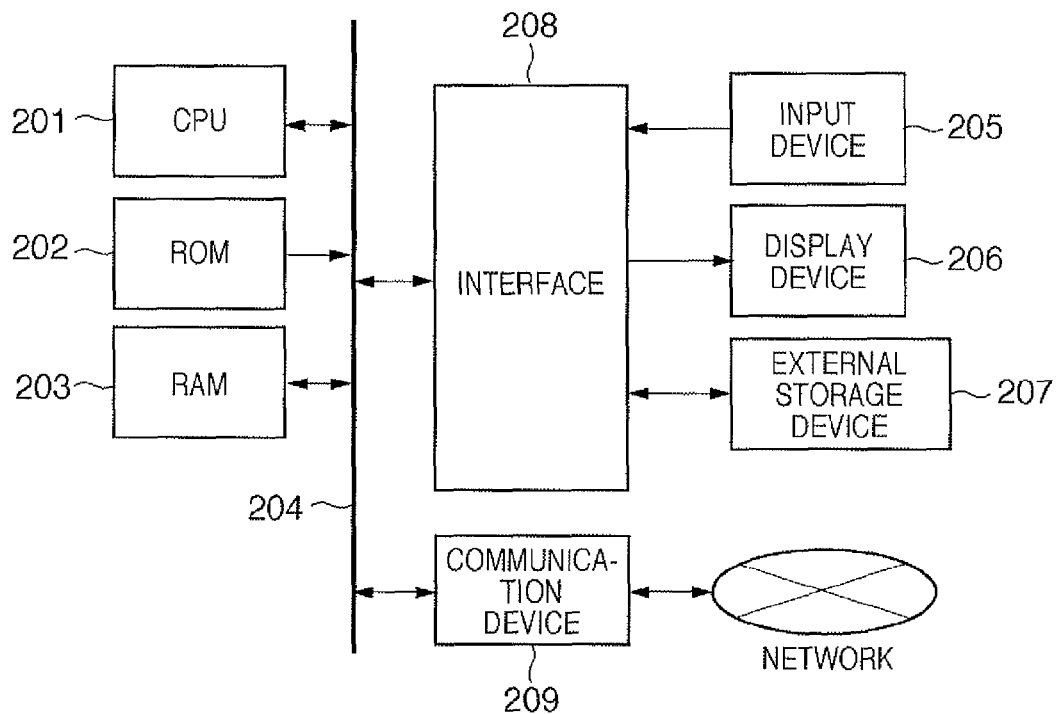
FIG. 2 is a block diagram illustrating an example of a computer configuration that implements the data management apparatus according to the first embodiment.

FIG. 2 is a block diagram of a computer system used in the data management apparatus 100. A CPU 201 runs the OS (Operating System) and various application programs (AP), controlling each component of the computer system. A ROM 202 stores programs executed by the CPU 201 and fixed data in parameters for use in arithmetic operations. A RAM 203 provides a work area or a temporary data storage area to the CPU 201. The ROM 202 and the RAM 203 are connected to the CPU 201 via a bus 204. An input device 205 such as a keyboard, a display device 206 such as a CRT or a liquid crystal display, and an external memory 207 such as a hard disk device, an MO (magneto optic disc), or a CD-read only memory are connected to the bus 204 via an interface 208. Meanwhile, the bus 204 is connected to a network via a communication device 209. The components illustrated in FIG. 1 can be implemented by having the CPU 201 execute programs loaded in the RAM 203 and exercise control using the devices illustrated in FIG. 2.

Figure 3A:
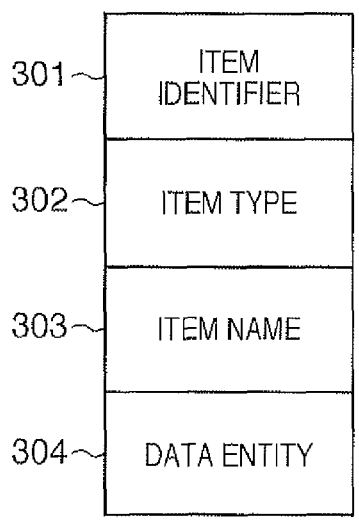
FIGS. 3A to 3C are diagrams respectively illustrating examples of data structures of an item, a relational data piece, and a relational attribute data piece for use in the first embodiment.
Figure 3B:
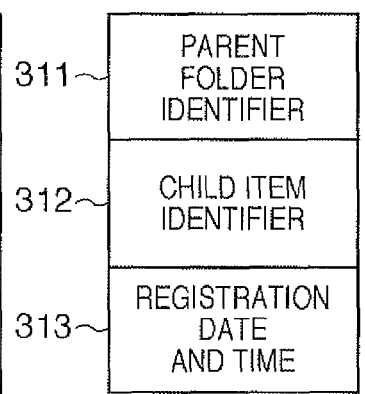
Figure 3C:
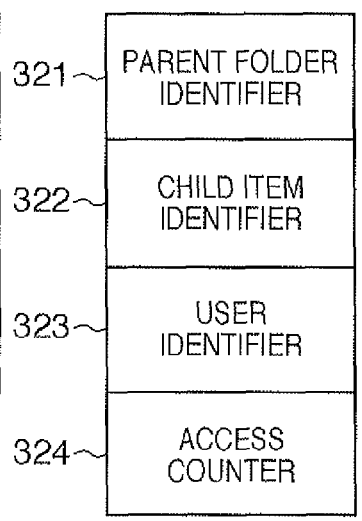

FIGS. 3A to 3C are diagrams illustrating examples of data structures of data pieces for use in the data management apparatus 100. FIG. 3A shows an example of the data structure of an item. Each item includes an item identifier 301 that uniquely identifies an item in a device, an item type 302 that indicates whether the item is a folder or not, an item name 303, and a data entity 304.

FIG. 3B is an example of the data structure of a relational data piece that is generated and managed by the relational data management unit 102. A parent folder identifier 311 of a relational data piece holds the item identifier 301 of a parent folder. A child item identifier 312 holds the item identifier 301 of an item that has been registered in the given folder. In this way, each relational data piece has recorded therein a pair of a parent folder that is a folder having child items registered therein and a child item such as file or a folder that has been registered in the parent folder. Note that a registration date and time 313 holds the date and time when the child item was registered in the parent folder. Note that each relational data piece can uniquely be identified in a device by the pair of its parent folder identifier and its child item identifier.

FIG. 3C is an example of the data structure of a relational attribute data piece that is appended to each relational data piece by the relational attribute appending unit 103. In the present embodiment, a user-by-user access counter (the details of which will be described later) is used as a relational attribute. A parent folder identifier 321 and a child item identifier 322 are respectively identical to the parent folder identifier 311 and the child item identifier 312 of the relational data piece to which the relational attribute data is appended. A user identifier 323 is an identifier that identifies a user who has acquired the relational data piece and accessed the child item. An access counter 324 indicates the number of times that the child item has been accessed as a child item of the parent folder indicated by the relational data piece to which the concerned relational attribute data is appended. As described above, the number of times an item is accessed counted by the access counter 324 is held for each user in a relational attribute data piece. Each relational attribute data piece can be uniquely identified in a device by a set of three identifiers, namely the parent folder identifier 321, the child item identifier 322, and the user identifier 323.

Although the present embodiment employs the above-described data structures, data structures that can implement the present invention are not limited thereto.

Figure 4:
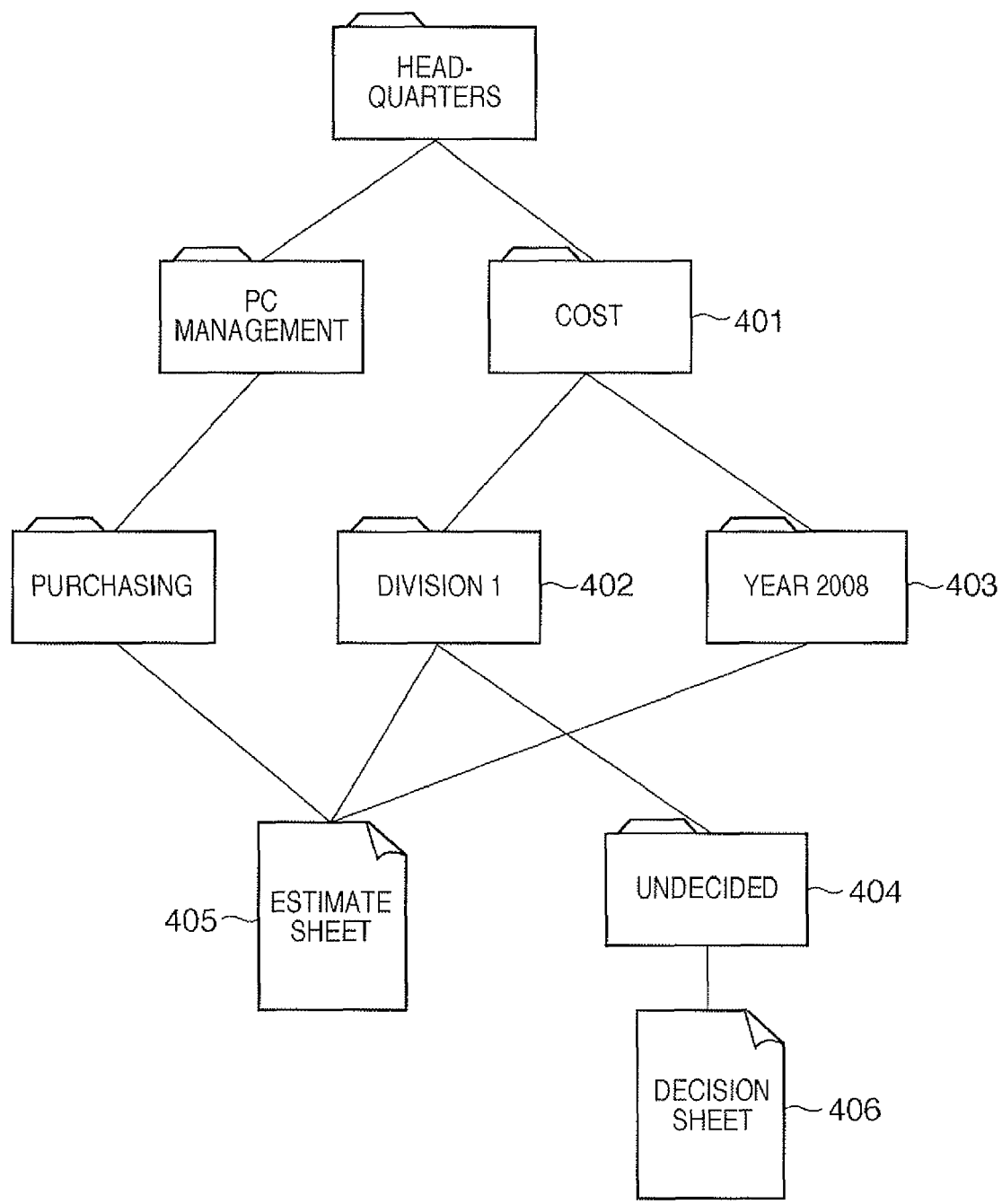
FIG. 4 is a diagram illustrating an example of a hierarchical folder structure for use in the description of the first embodiment.
Figure 5:
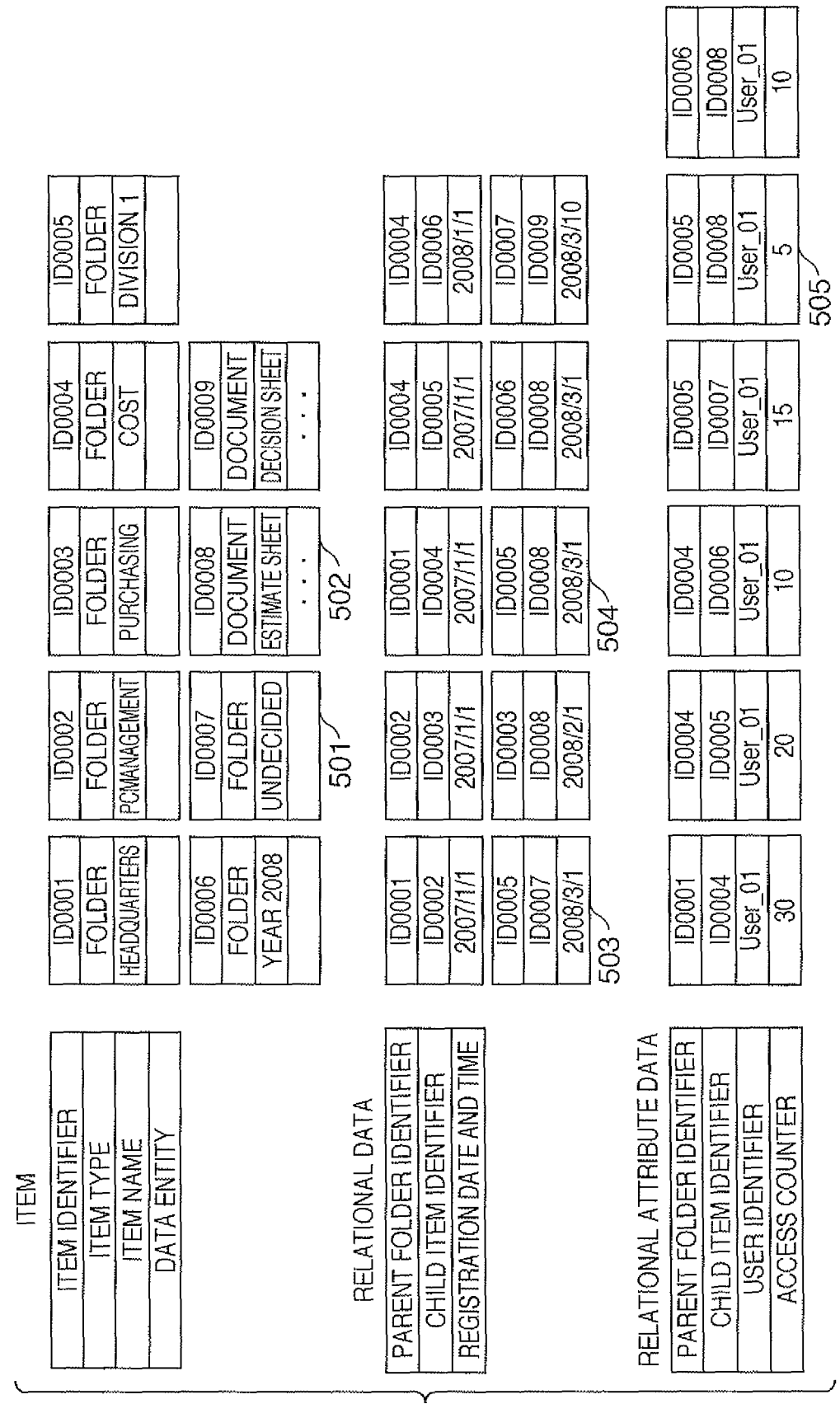
FIG. 5 is a diagram illustrating examples of data, namely items, relational data pieces, and relational attribute data pieces, in the hierarchical folder structure illustrated in FIG. 4.

First, the fundamental operation of the relational data management according to the present embodiment is described. The following description is given taking an example where items have been registered in a hierarchical folder structure illustrated in FIG. 4. FIG. 5 illustrates items, relational data pieces, and relational attribute data pieces, which are stored in the storage unit 107, under these conditions. Note that items, relational data pieces, and relational attribute data pieces that are unnecessary for the description here are not shown in FIG. 5.

Figure 12:
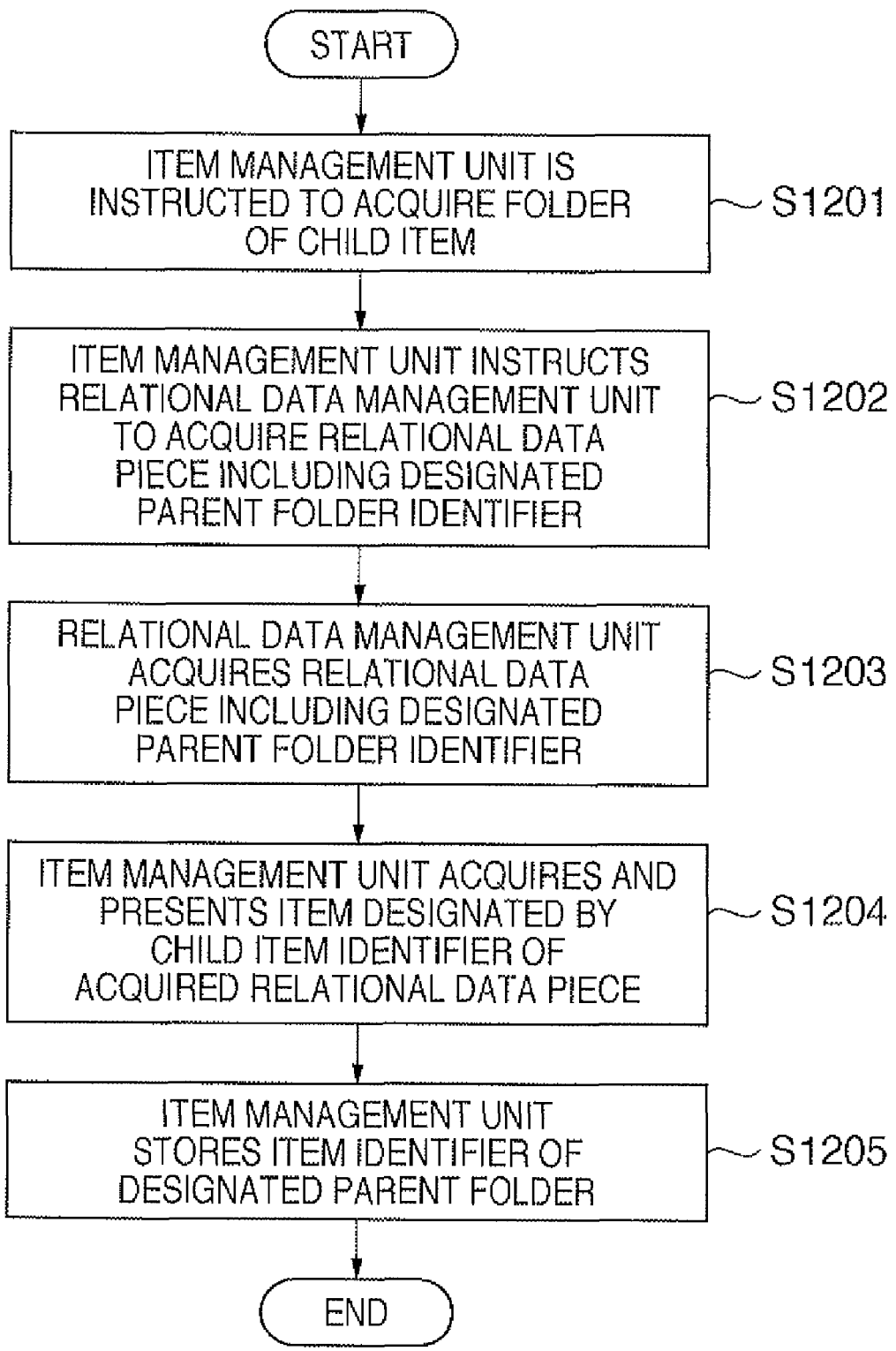
FIG. 12 is a flow chart illustrating a process for opening a folder, according to the first embodiment.

Now, a process for opening a folder is described with reference to the flow chart of FIG. 12. A user selects a folder to be opened and gives an instruction to the item management unit 101 to acquire a child item (step S1201). A "Division 1" folder 402 is assumed to have been selected in the present example. The item management unit 101 acquires the item identifier 301 ("ID0005" in the present example) of the selected folder and requests the relational data management unit 102 to acquire relational data pieces that contain the acquired item identifier as their parent folder identifier 311 (step S1202). The relational data management unit 102 acquires relational data pieces whose parent folder identifier 311 is "ID0005" from the storage unit 107 and returns a list of such relational data pieces to the item management unit 101 (step S1203). In the present example, a list including two relational data pieces 503 and 504 is returned.

The item management unit 101 then extracts the child item identifiers 312 from the list of relational data pieces acquired from the relational data management unit 102. In the present example case, "ID0007" and "ID0008" are extracted respectively from the relational data pieces 503 and 504. The item management unit 101 then acquires items whose item identifier is either "ID0007" or "ID0008", namely items 501 and 502, from the storage unit 107 and presents those items as the child items of the "Division 1" folder 402 to the user (step S1204). As a result, an "undecided" folder 404 (ID0007) and "estimate sheet" data 405 (ID0008) are presented as the child items of the "Division 1" folder 402 to the user. As a last step, the item identifier of the currently opened folder ("ID0005" in the present example) is stored in the storage unit 107 (step S1205). Note that the RAM 203, for example, is used for the storage of the item identifier in step S1205. The foregoing is the description of the processing performed on relational data pieces at the time of opening a folder.

Figure 13:
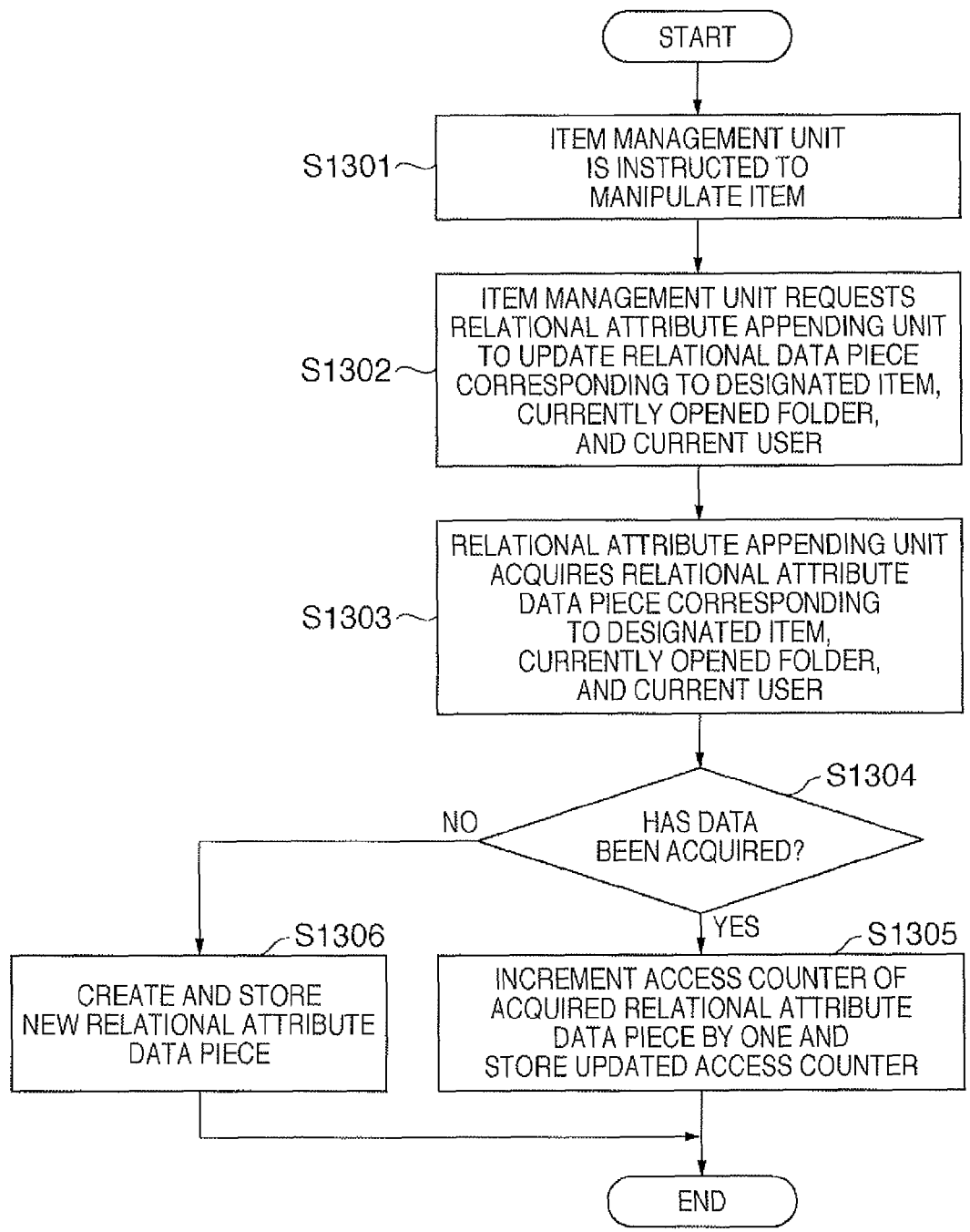
FIG. 13 is a flow chart illustrating a process for manipulating an item, according to the first embodiment.

Next, a process for accessing an item is described with reference to the flow chart of FIG. 13. Note that the following description is given taking an example where access is from the "Division 1" folder 402 to the "estimate sheet" data 405.

A user selects a specific item (the "estimate sheet" data 405 in the present example) from among the child items acquired as a result of opening the "Division 1" folder 402 and gives an instruction to the item management unit 101 for arbitrary manipulations (step S1301). Upon receipt of such an item manipulation instruction, the item management unit 101 gives an instruction to the relational attribute appending unit 103 to update the relationship between the currently opened folder and the concerned item. The item identifier that has been stored in the RAM 203 in step S1205 is the identifier of the currently opened folder. From this, the item management unit 101 requests the relational attribute appending unit 103 to update a relational attribute data piece that contains:

(1) the parent folder identifier 321 identical to the identifier stored in the RAM 203;

(2) the child item identifier 322 identical to the item identifier of the designated item; and (3) the user identifier 323 identical to the user identifier of the current user (step S1302).

Assume in the present example that the item identifier stored in the RAM 203 is "ID0005" and the identifier of the designated item is "ID0008". Also assume that the user identifier is "User_01".

The relational attribute appending unit 103 acquires a relational attribute data piece that contains the parent folder identifier 321 of "ID0005", the child item identifier 322 of "ID0008", and the user identifier 323 of "User_01", from the storage unit 107 (step S1303). Then, if an appropriate relational attribute data piece has been acquired in step S1303, the access counter 324 of the acquired relational attribute data piece is incremented by one and stored in the storage unit 107 (steps S1304 and S1305). In the present example, a relational attribute data piece 505 is acquired and its access counter is updated. The access counter of the relational attribute data piece 505 is updated from 5 to 6 in the present example. On the other hand, if an appropriate relational attribute data piece has not been acquired in step S1303, a new relational attribute data piece is created and stored in the storage device with its access counter being set to 1 (steps S1304 and S1306). The foregoing is the description of the processing performed on relational data pieces when an item is accessed.

Figure 14:
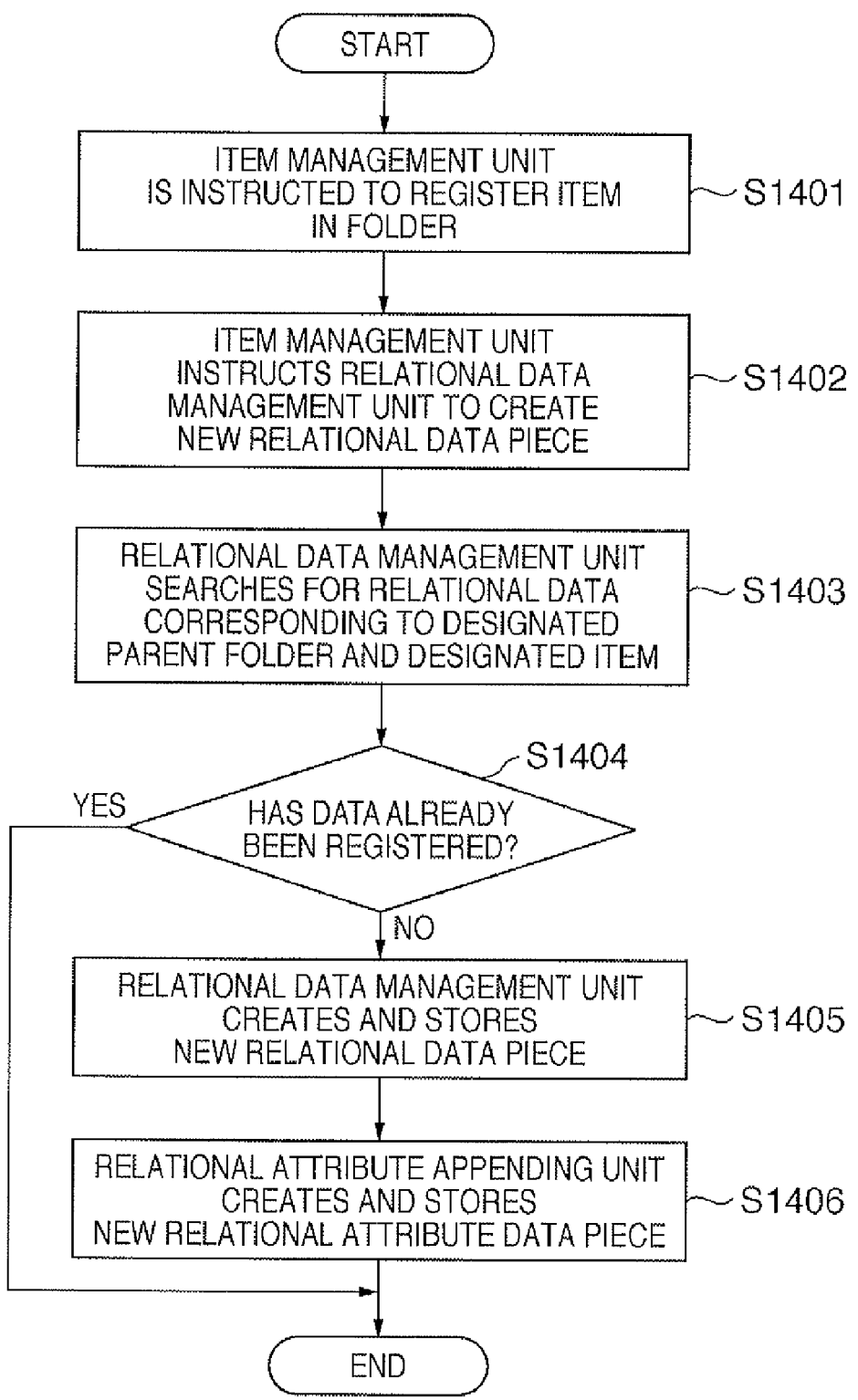
FIG. 14 is a flow chart explaining a process for registering an item in a folder, according to the first embodiment.

A process for registering an item in a folder is described next with reference to the flow chart of FIG. 14. The description here is given taking an example where an "undecided" folder 404 in the condition illustrated in FIG. 4 is registered in a "cost" folder 401. A user designates a parent folder and a child item to be registered in the parent folder via the input device 205 and gives an instruction to the item management unit 101 to register the item in the folder (step S1401). The item management unit 101 designates the identifiers of the designated parent folder and the designated child item and gives an instruction to the relational data management unit 102 to create a new relational data piece (step S1402). In the present example, "ID0004" is designated as the identifier of the parent folder and "ID0007" is designated as the identifier of the child item. Alternatively, registration may be performed so that the "cost" folder 401 belongs to the "undecided" folder 404. Either the method allowing such registration or the method not allowing such registration is possible. The relational data management unit 102 searches for a relational data piece that contains a pair of the designated item identifiers through the storage unit 107 (step S1403). Then, if it has been confirmed that such a relational data piece has not yet been registered, a new relational data piece is created and stored in the storage unit 107 (steps S1404 and S1405). Following this, the relational attribute appending unit 103 creates a new relational attribute data piece that includes the parent identifier and the child item identifier, which are identical to those of the created relational data piece, and a user identifier that identifies a current user, and sets the access counter of the created relational attribute data piece to 1. Then, this new relational attribute data piece is stored in the storage unit 107 (step S1406).

Figure 6:
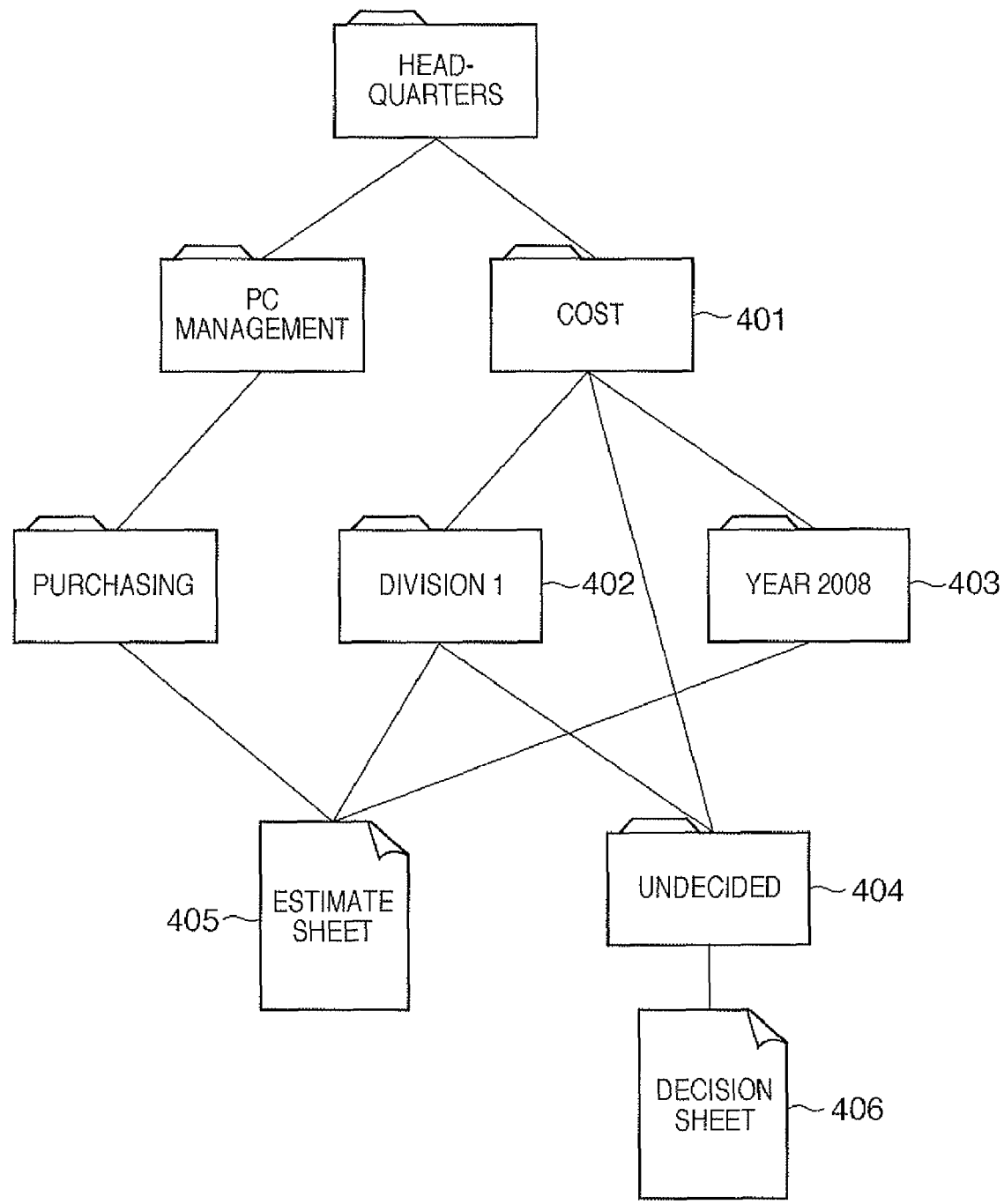
FIG. 6 is a diagram illustrating the hierarchical folder structure used in the description of the first embodiment.

FIG. 6 illustrates a folder hierarchy after the "undecided" folder 404 has been registered as a child item in the "cost" folder 401. FIG. 7 illustrates a new relational data piece 706 and a new relational attribute data piece 707 that have been created through the above processing. The foregoing is the description of the processing performed on relation data pieces at the time of registering an item in a folder.

Figure 15:
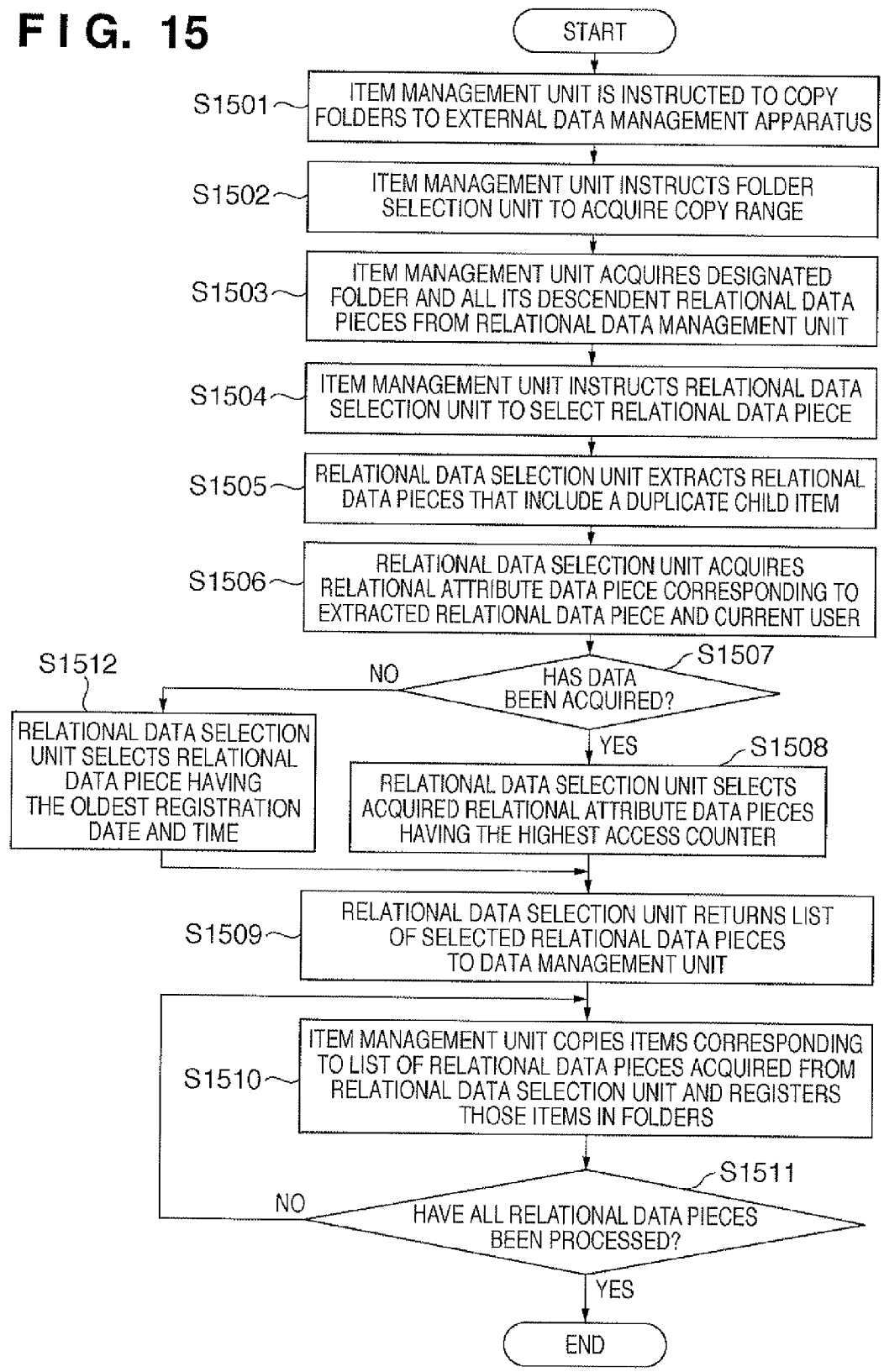
FIG. 15 is a flow chart illustrating a process for copying a folder into an external data management apparatus using a tree structure, according to the first embodiment.

Now, a process for copying a folder from the data management apparatus 100 to an external data management apparatus using a tree structure is described with reference to the flow chart of FIG. 15. The description here is given taking an example where the "cost" folder 401 in the condition illustrated in FIG. 6 is copied immediately below a "work" folder on a data management apparatus that is running on an external PC (host name: "MyPC"). Assume also that the "undecided" folder 404 has been accessed 50 times as a child item of the "cost" folder 401. From this, it can be assumed that the access counter of a relational attribute data piece 707 is 50. Note that examples of the methods for designating a folder on an external data management apparatus include UNC, URL, and so on; however, the present invention is not intended to limit such methods. In the present example, assume that the "work" folder is designated as "\\MyPc\work" using a UNC address; if a copy destination is designated by a UNC address, the item management apparatus regards the operation as copying to an external apparatus.

Figure 8:
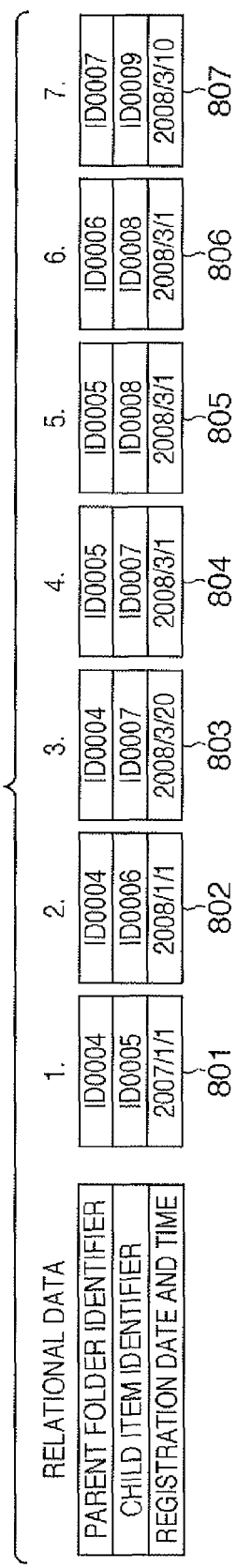
FIG. 8 is a diagram illustrating a list of relational data pieces selected by a folder selection unit according to the first embodiment.

When a user selects a folder to be copied and a copy destination folder via the input device 205 and gives an instruction to the item management unit 101 to copy the folder, the item management unit 101 receives this instruction (step S1501). The item management unit 101 then acquires the item identifier (the item identifier, "ID0004", of the "cost" folder 401, in the present example) from the folder to be copied. The item management unit 101 then designates the acquired item identifier ("ID0004") and instructs the folder selection unit 106 to acquire the range of copying (step S1502). The folder selection unit 106 acquires all descendant relational data pieces in the hierarchy from the relational data management unit 102, using as a starting point the folder indicated by the designated item identifier ("ID0004") (step S1503). In the present example, as illustrated in FIG. 8 and as will be described later, seven descendant relational data pieces of the "cost" folder 401 in the hierarchy are acquired:

| Parent Folder | Child Item |
|---|---|
| 1. "Cost" | "Division 1" (reference numeral 801) |
| 2. "Cost" | "Year 2008" (reference numeral 802) |
| 3. "Cost" | "Undecided" (reference numeral 803) |
| 4. "Division 1" | "Undecided" (reference numeral 804) |
| 5. "Division 1" | "Estimate sheet" (reference numeral 805) |
| 6. "Year 2008" | "Estimate sheet" (reference numeral 806) |
| 7. "Undecided" | "Decision sheet" (reference numeral 807) |

The folder selection unit 106 returns a list of the acquired relational data pieces to the item management unit 101. Following this, the item management unit 101 transfers the list of relational data pieces acquired from the folder selection unit 106 to the relational data selection unit 104 and gives an instruction to select a relational data piece (step S1504). In the present embodiment, since the data management apparatus to which a folder is copied uses a tree structure, the item management unit 101 instructs the relational data selection unit 104 to select a relational data piece in such a manner as to configure each item to belong to only a single parent folder.

Figure 9:
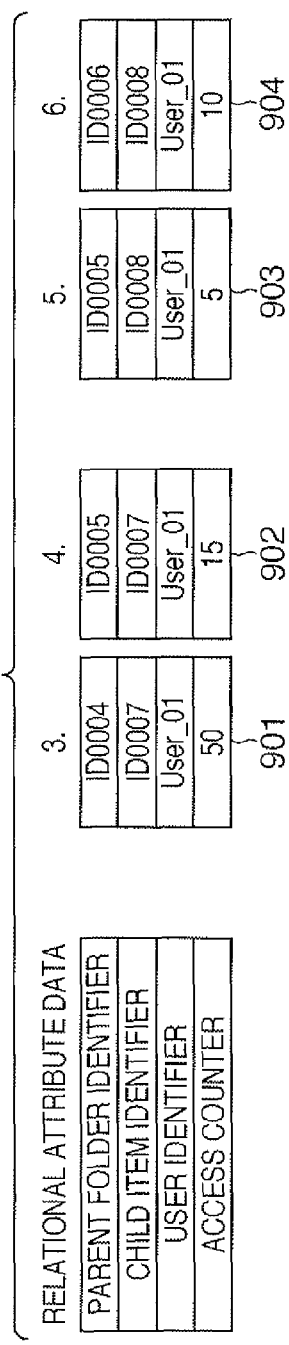
FIG. 9 is a diagram illustrating a list of relational attribute data pieces selected by a relational data selection unit according to the first embodiment.

As a method for selecting one of multiple parent folders of an item, the present embodiment adopts a method for selecting a parent folder that has been opened the most times by users to access the given item. In other words, a method for locating an item on a folder path that is most often used by users is employed. Specifically, the relational data selection unit 104 first extracts relational data pieces that contain a duplicate child item from the list of relational data pieces received from the item management unit 101 (step S1505). In the present example, relational data pieces 803 and 804 and relational data pieces 805 and 806 in FIG. 8 are extracted. Then, the parent folder identifier and the child item identifier are acquired from each of the extracted relational data pieces, and a relational attribute data piece that contains two such identifiers and a user identifier that identifies a current user is acquired from the storage unit 107 (step S1506). In the present example, as illustrated in FIG. 9, relational attribute data pieces 901 to 904 are acquired respectively for the relational data pieces 803 to 806, that is, a single relational attribute data piece is acquired for each relational data piece.

Figure 10:
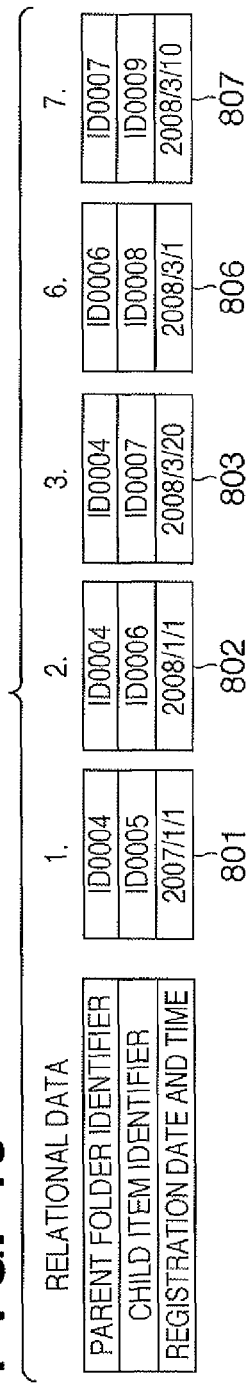
FIG. 10 is a diagram illustrating a list of relational data pieces selected by the relational data selection unit according to the first embodiment.

If a relational attribute data piece has been acquired in step S1506, the access counter of the acquired relational attribute data piece is acquired; then, the access counters of those relational attribute data pieces that contain a duplicate child item identifier are compared to select the one that contains the highest access counter (steps S1507 and S1508). Specifically, for the "undecided" folder 404, the access counters of the relational attribute data pieces 901 and 902 are compared; since they are respectively 50 and 15, the relation data piece 803 that corresponds to the relational attribute data piece 901 is selected. That is, the "cost" folder 401 is selected as the parent folder of the "undecided" folder 404. Similarly, for the "estimate sheet" data 405, the access counters of the relational attribute data pieces 903 and 904 are compared; since they are respectively 5 and 10, the relational data piece 806 that corresponds to the relational attribute data 904 is selected. That is, the "year 2008" folder 403 is selected as the parent folder of the "estimate sheet" data 405. As a last step, the relational data pieces 801, 802, and 807 that contain no duplicate child item and the selected relational data pieces 803 and 806 are combined to form a list of relational data pieces (see FIG. 10), which is then returned to the item management unit 101 (step S1509).

Figure 11B:
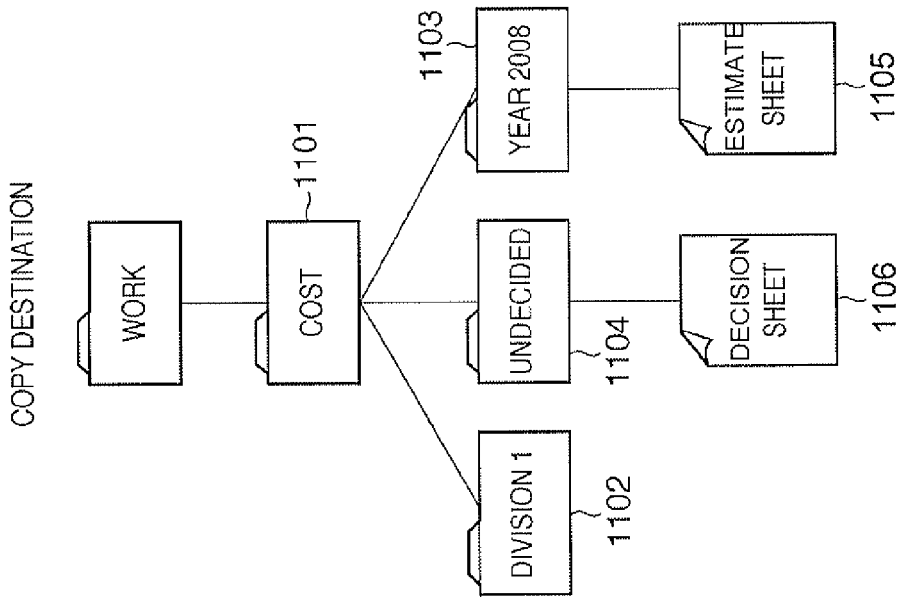
FIGS. 11A and 11B are diagrams explaining an example of the case where folders are copied into an external data management apparatus according to the first embodiment.
Figure 11A:
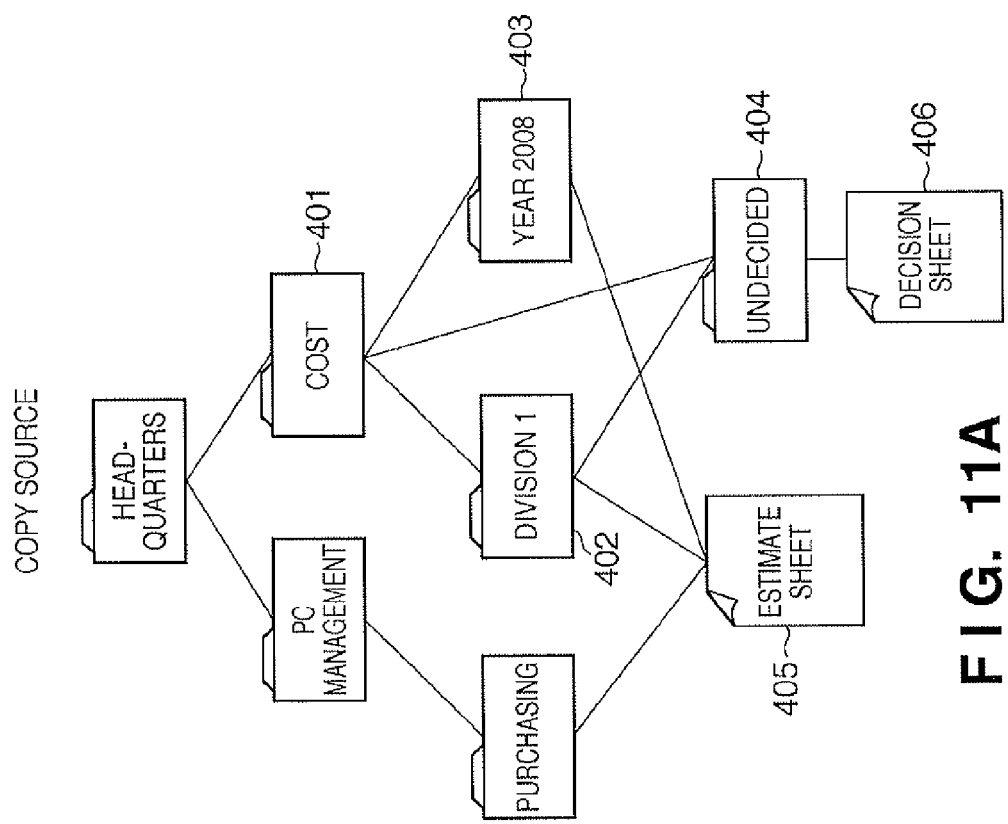

After acquiring a list of relational data pieces from the relational data selection unit 104, the item management unit 101 copies the "cost" folder and its descendent items under a copy destination folder via the communication unit 108. First, the "cost" folder 401 indicated by the parent folder identifier of the relational data piece 801 is copied immediately under the copy-destination "work" folder. Following this, the "Division 1" folder 402 indicated by the child item identifier of the relational data piece 801 is copied and registered as a child item of the "cost" folder 401 based on the relational data piece 801. Similarly, such copies and registration of parent folders and child items are performed for all the relational data pieces acquired from the relational data selection unit 104 so that a folder hierarchy is built at the copy destination (steps S1510 and S1511). FIGS. 11A and 11B illustrate a case where a copy-source folder hierarchy (a non-tree structure in FIG. 11A) is converted into a copy-destination folder hierarchy (a tree structure in FIG. 11B). As mentioned previously, an "undecided" folder 1104 that corresponds to the "undecided" folder 404 is registered in only a "cost" folder 1101 that corresponds to the "cost" folder 401. Similarly, "estimate sheet" data 1105 that corresponds to the "estimate sheet" data 405 is registered in only a "year 2008" folder 1103 that corresponds to the "year 2008" folder 403.

Now, if an item that has never been accessed by a current user is included in the range of copying, that is, if a relational attribute data piece for the current user has not yet been created, a parent folder cannot be selected based on the access counter. In that case, according to the present embodiment, the registration date and time is compared between relational data pieces so that a copy-destination folder hierarchy is built based on a relational data piece that has been registered earlier (step S1512). Note that the processing of steps S1505 to S1508 and S1512 is performed for each child item on each set of relational data pieces that contain a duplicate child item.

As described above, the first embodiment prevents duplicate copies or a loss of data at the time data is exported from a non-tree-structure system to a tree-structure system. Accordingly, a user-usable tree structure can automatically be built at the destination of data export. In other words, users are capable of accessing data in a tree-structure system without impairing the usability that they experience in a non-tree-structure system, which facilitates the export of data between systems.

Note that, in the above-described embodiment, the access counter of a relational attribute data piece that has been recorded for each user is used to select a single parent folder from multiple parent folders that contain a duplicate child item, the present invention is not limited thereto. For example, each relational attribute data piece may include an access date and time that is recorded for each user, and the relational data selection unit 104 may select a relational data piece having the latest access date and time. In other words, each relational attribute data piece may hold access-history information so that the relational data selection unit 104 can select a relational data piece based on the access history. In this case, in response to the accessing of a child item, the relational attribute appending unit 103 updates the access history of a relational data piece that corresponds to a pair of the accessed child item and a parent folder on a path of that access in step S1305.

Second Embodiment

A fundamental module configuration and data structures according to a second embodiment conform to those described in the first embodiment.

The first embodiment described a configuration in which, when folders are copied from the data management apparatus 100 to an external data management apparatus using a tree structure, a single parent folder is selected for each child item that belongs to multiple parent folders. However, the present invention is not limited to such a configuration for copying items in a non-tree-structure system to a tree-structure system. The second embodiment describes a configuration in which access is created from an external data management apparatus using a tree structure to the data management apparatus 100 in order to view a folder hierarchy.

First, an external data management apparatus requests that the item management unit 101 view a folder hierarchy via the communication unit 108. Such a viewing request includes at least a user identifier that is valid on the data management apparatus 100 and an item identifier of a to-be-viewed folder. When receiving such a viewing request, the item management unit 101 presents a designated folder and its descendant folders in the hierarchy to the external data management apparatus. In the present example, since the external data management apparatus uses a tree structure, the item management unit 101 builds and presents a hierarchical folder structure in which each item is configured to belong to a single parent folder. Such a parent-folder selection method can be implemented with a similar configuration and similar processes to those described in the first embodiment, so the description thereof is omitted here.

Third Embodiment

A third embodiment is described next. In the above-described first and second embodiments, the value of the access counter 324 of a relational attribute data piece that has been recorded for each user is referred to in order to select a single parent folder for each child item that belongs to multiple parent folders. In the third preferred embodiment, on the other hand, each relational attribute data piece contains a master-slave relationship among relational data pieces, and this information is used to select a parent folder. Note that the fundamental module configuration and data structures according to the present embodiment conform to those described in the first embodiment.

Figure 16:
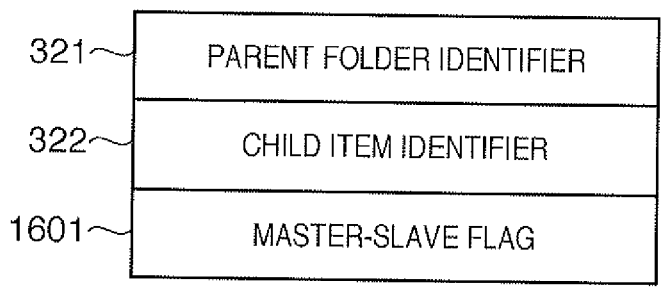
FIG. 16 is a diagram illustrating an example of the data structure of a relational attribute data piece, according to a third embodiment.

FIG. 16 is a diagram illustrating an example of the data structure of a relational attribute data piece according to the third embodiment. Each relational attribute data piece according to the present embodiment includes the parent folder identifier 321, the child item identifier 322, and a master-slave flag 1601.

A process for registering an item in a folder will be described first; in the third embodiment, the item management unit 101 receives a parent folder, a child item, and a user designation for the master-slave relationship that determines whether the item is to be registered as a master or a slave. In the present example, only a single master can be registered for each single item. Thus, in the case where an item belongs to multiple parent folders, those parent folders are classified into a single parent folder registered as a master and one or more parent folders registered as a slave according to the master-slave information in the present embodiment. In other words, information indicating a master can be appended to only a single one of the relational data pieces that contain a common child item. Information indicating either a master or a slave may be set by a user via a predetermined user interface at the time of, for example, registering a child item in a parent folder.

Figure 17:
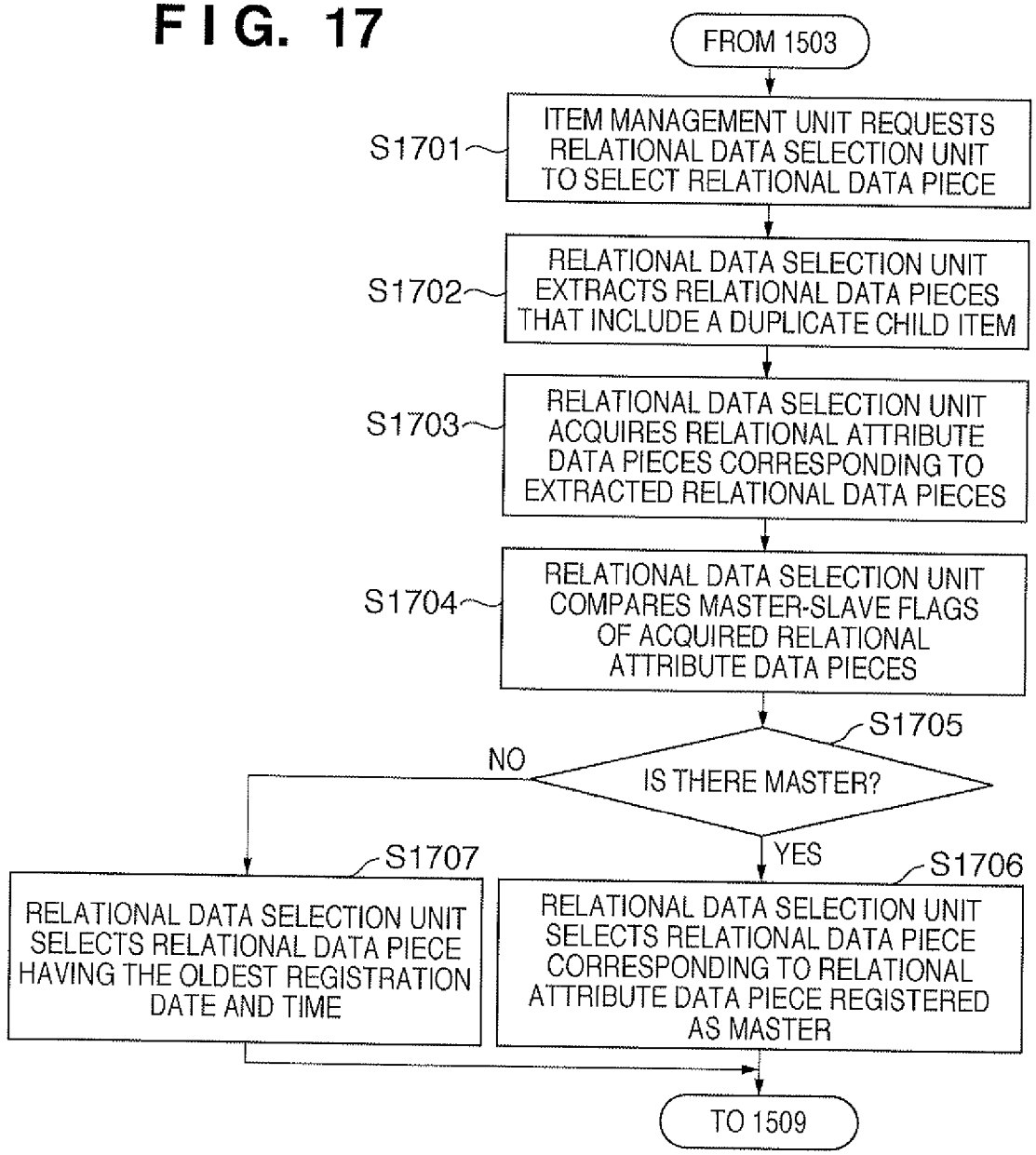
FIG. 17 is a flow chart illustrating a process performed by the relational data selection unit, according to the third embodiment.

A process for copying folders to an external data management apparatus using a tree structure according to the third embodiment is described next with reference to the flow chart of FIG. 17. The fundamental procedure conforms to that described in the first embodiment; the present embodiment describes the process performed by the relational data selection unit 104, that is, the process for selecting a single parent folder in the case where a single child item belongs to multiple parent folders. Steps S1504 to S1508 and S1512 in FIG. 15 can be replaced by the process illustrated in FIG. 17.

When acquiring a list of relational data pieces within the range of copying from the item management unit 101 (step S1701), the relational data selection unit 104 extracts relational data pieces that contain a duplicate child item (step S1702). The relational data selection unit 104 then acquires relational attribute data pieces that correspond to the extracted relational data pieces (step S1703) and compares the master-slave flags 1601 of those relational attribute data pieces (step S1704). If there is a relational attribute data piece whose master-slave flag 1601 has been set to master, the relational data selection unit 104 selects a relational data piece corresponding to this relational attribute data piece (steps S1705 and S1706). If the relational attribute data pieces that contain a duplicate child item include no relational attribute data piece whose master-slave flag 1601 has been set to master, on the other hand, the relational data selection unit 104 selects a relational data piece having the oldest registration date and time (step S1707). The following process for copying items based on the relational data piece selected by the relational data selection unit 104 is identical to that described in the first embodiment.

Note that the processing of S1702 to S1707 is performed for each child item on each set of relational data pieces that contain a duplicate child item.

Fourth Embodiment

A fourth embodiment is described next.

Figure 18:
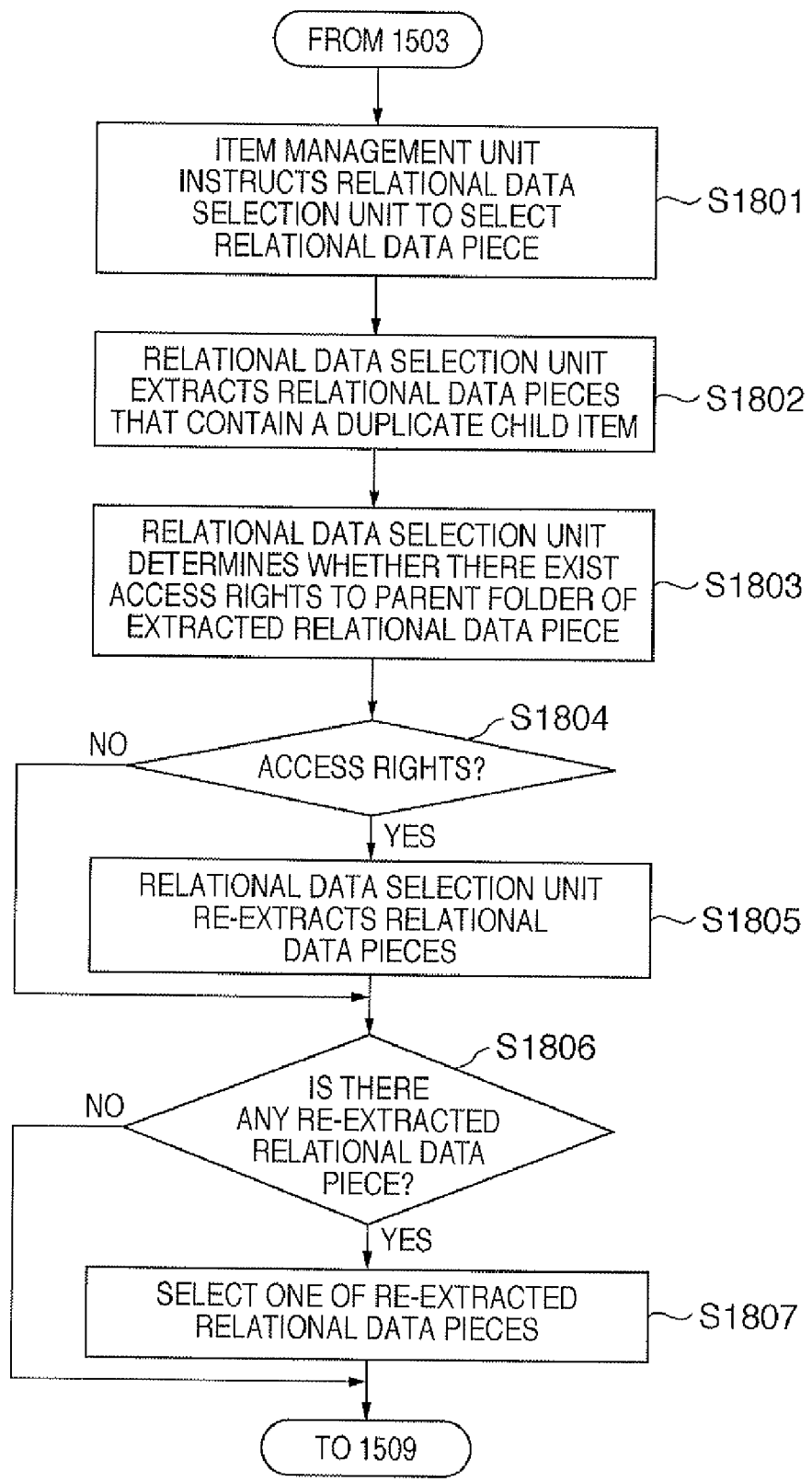
FIG. 18 is a flow chart illustrating a process performed by the relational data selection unit, according to a fourth embodiment.

While no consideration is given to access rights to items in the embodiments described above, the fourth embodiment enables the setting of access rights on each item. A process for copying folders to an external data management apparatus using a tree structure, according to the fourth embodiment, is described below with reference to the flow chart of FIG. 18. Note that the fundamental processes according to the fourth embodiment conform to those described in the first to third embodiments; the following description is thus given of the process performed by the relational data selection unit 104, that is, the process for selecting a single parent folder in the case where a single child item belongs to multiple parent folders. Steps S1504 to S1508 and S1512 in FIG. 15 can be replaced by the process illustrated in FIG. 18.

When acquiring a list of relational data pieces within the range of copying from the item management unit 101 (step S1801), the relational data selection unit 104 extracts relational data pieces that contain a duplicate child item (step S1802). Then, the relational data selection unit 104 acquires the parent folder identifiers of the extracted relational data pieces and determines whether the current user has access rights to those parent folders (step S1803). Note that whether or not there exist access rights may be determined by, for example, referring to a previously prepared table or the like that indicates access rights between parent folders and user IDs. For example, records each having a pair of a "parent folder" and a "user ID" may be recorded in such a table so that whether or not there exist access rights can be determined by the presence or absence of a record. Thereafter, the relational data selection unit 104 re-extracts only those relational data pieces that correspond to parent folders that the current user has the right to access (steps S1804 and S1805). If only a single relational data piece has been re-extracted, this relational data piece is selected; if multiple relational data pieces have been re-extracted, one of those re-extracted relational data pieces is selected (steps S1806 and S1807). Such a process for selecting one of multiple relational data pieces conforms to the selection processes described in the first embodiment (steps S1505 to S1508 and S1512) and the third embodiment (steps S1702 to S1707), so the description thereof is omitted here. Note that if none of the parent folders that a current user has the right to access has been extracted in step S1805, the concerned item is not copied; this presents no problem because such an item cannot inherently be accessed through folders within the range of copying.

Note that, in the above-described embodiments, if a uniquely-identified relational data piece cannot be selected based on relational attribute data pieces, the relational data selection unit selects a relational data piece having the oldest registration date and time; however, the present invention is not limited thereto. For example, such a relational data piece that cannot be identified uniquely may be selected by a user. A configuration that provides a user interface for such a case is evident to those skilled in the art.

Fifth Embodiment

A fifth embodiment is described next.

The above-described embodiments described the configurations in which, when folders are copied to an external data management apparatus using a tree structure, a copy-destination hierarchical folder structure is built by selecting a single parent folder for each child item that belongs to multiple parent folders. In addition to such processes described in the first to fourth embodiments, the fifth embodiment uses the function that an external data management apparatus may have, such as psuedo-registration of a single item in multiple parent folders. For example, if a copy-destination external data management apparatus runs on Microsoft Windows®, a hierarchical folder structure is built by selecting one of the parent folders for each item with the use of any of the methods described in the above-described embodiments, and a shortcut to each item is registered in those parent folders that have not been selected. In the case where a copy-destination external data management apparatus is a Unix® File System, a link to each item is registered in those parent holders that have not been selected.

For example, in the copy-destination tree structure illustrated in FIG. 11B, a shortcut to the "undecided" folder 1104 and a shortcut to the "estimate sheet" data 1105 are registered in the "Division 1" folder 1102.

The above-described fifth embodiment allows a user to have the same usability that they experience on the copy-source side, even on the copy-destination side, as long as access to items is created from the top through a folder hierarchy. Note that the function of limiting parent folders to only one is also an absolute necessity for the present embodiment, from which it is apparent that the present embodiment does not make any change to the nature of the present invention.

Note that, in the case where folders are copied to an external data management apparatus using a tree structure, for an item that has been registered in multiple parent folders on a copy-source side, the external data management apparatus may keep information indicating that the item had belonged to multiple parent folders, as attribute information on that item.

The parent-folder selection method performed by the relational data selection unit 104 is not limited to only those described in the above-described embodiments. As other alternatives, a parent folder having the latest creation date and time, the first parent folder in order of name, a parent folder having the highest access frequency for all users, or a parent folder having the highest priority for each user may be selected. Still alternatively, a total number of times an item is accessed for all users (i.e., a total of the access counters of relational attribute data pieces for all users) may be used. In this case, a single relational attribute data piece is created for each combination of the parent folder identifier and the child item identifier so that the access counter can be updated every time an item is accessed according to such a combination, irrespective of users. Accordingly, each relational attribute data piece does not need the user identifier in this case. It is also possible to select a single parent folder based on relevance or the like to other items in a folder. Examples of such a case include "selecting a common parent for all items in a folder" and "selecting a common parent folder for HTML files and for image files in the HTML files".

The present invention may be applied to an apparatus composed of a single device.

For example, the function of the data management apparatus 100 may be applied to a Samba-equipped device or may be applied to a Windows-equipped device. The present invention may also be applied to a relay device between Samba and Windows.

Also, the present invention may be applied to a system constituted from a plurality of devices. For example, the present invention may be constituted by applying its components to different devices, such as applying the data management unit to a Samba-equipped device or applying the relational data selection unit to a Windows-equipped device.

The present invention enables a hierarchical folder structure where a single item can belong to multiple parent folders to be properly converted into a tree structure where a single item can belong to only a single parent folder.

While the exemplary embodiments have been described in detail above, the present invention can take an embodiment as a system, an apparatus, a method, a program, or a storage medium (recording medium), for example.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-020739, filed Jan. 30, 2009, which is hereby incorporated by reference herein in its entirety.

What is claimed is:

1. A data management method for converting an item in a first hierarchical folder structure into an item in a second hierarchical folder structure, the first hierarchical folder structure being such that a single item that is either data or a folder is registered in either a single or plural folders, the second hierarchical folder structure being such that a single item is registered in a single folder,
the method comprising:
a relational data acquiring step of acquiring, in the first hierarchical folder structure, a plurality of relational data pieces for items, each relational data piece indicating one item as a child item and indicating one parent folder in which said child item has been registered;
an attribute appending step of appending attribute information to each of the acquired relational data pieces, wherein the attribute information includes an access history, and wherein, when an item has been accessed as a child item of a parent folder, an access history included in attribute information appended to a relational data piece indicating said child item and said parent folder is updated;
a selection step of, when one of the items is included in plural ones of the relational data pieces, selecting one of the plural ones of the relational data pieces based on the access history; and
a conversion step of converting the item included in the selected relational data piece into an item in the second hierarchical folder structure so that the converted item is registered in a single parent folder included in the selected relational data piece, wherein a folder having no child item, which is generated as a result of the conversion, remains in the second hierarchical folder structure as a vacant folder belonging to one of folders to which the vacant folder belonged in the first hierarchical folder structure.

2. The method according to claim 1, wherein
the access history includes an access frequency, and
in the selection step, a relational data piece that has been appended with the attribute information including the access history that has a highest value for the access frequency is selected.

3. The method according to claim 1, wherein
the access history includes an access date and time, and
in the selection step, a relational data piece that has been appended with the attribute information including the access history that has a latest value for the access date and time is selected.

4. The method according to claim 1, further comprising:
a setting step of, when one of the items is included in a plurality of relational data pieces acquired in the relational data acquiring step, causing a user to set up master-slave information in which one of the plurality of relational data pieces is registered as a master and any relational data piece other than the master is registered as a slave, wherein
in the attribute appending step, attribute information including the master-slave information is appended to a relational data piece that has been registered as the master according to the master-slave information, and
in the selection step, a relational data piece that has been appended with the attribute information including the master-slave information according to which the relational data piece has been registered as the master is selected.

5. The method according to claim 1, wherein,
the parent folders are appended with information that indicates access rights to the parent folders, and
in the selection step, one of the plurality of relational data pieces that includes a parent folder that permits a specific user to have access rights is selected.

6. The method according to claim 1, further comprising a registration step of, in the conversion step, registering either a shortcut or a link to the converted item in a folder obtained by converting a parent folder that is included in an unselected one of the relational data pieces that include a pre-conversion item from which the converted item has been obtained.

7. A computer-readable recording medium storing a computer program that causes a computer to perform the data management method according to claim 1.

8. The method according to claim 1, wherein the attribute information includes a user identifier, and
wherein, in the selection step, a relational data piece is selected based on a current user and a user identifier in the attribute information.

9. The method according to claim 1, wherein the item included in the selected relational data piece is included in the first hierarchical folder structure in which a single item can be registered in multiple parent folders, and wherein the converted item is in the second hierarchical folder structure in which a single item can be registered in only a single parent folder.

10. A data management apparatus for converting an item in a first hierarchical folder structure into an item in a second hierarchical folder structure, the first hierarchical folder structure being such that a single item that is either data or a folder is registered in either a single or a plurality of folders, the second hierarchical folder structure being such that a single item is registered in a single folder, the apparatus comprising:

a relational data acquiring unit configured to acquire, in the first hierarchical folder structure, a plurality of relational data pieces for items, each relational data piece indicating one item as a child item and indicating one parent folder in which said child item has been registered;

an attribute appending unit configured to append attribute information to each of the acquired relational data pieces, wherein the attribute information includes an access history, and wherein, when an item has been accessed as a child item of a parent folder, an access history included in attribute information appended to a relational data piece indicating said child item and said parent folder is updated;

a selection unit configured to select one of plural ones of the relational data pieces based on the access history when one of the items is included in the plurality of relational data pieces; and a conversion unit configured to convert the item that is included in the selected relational data piece into an item in the second hierarchical folder structure so that the converted item is registered in a single parent folder that is included in the selected relational data piece, wherein a folder having no child item, which is generated as a result of the conversion, remains in the second hierarchical folder structure as a vacant folder belonging to one of folders to which the vacant folder belonged in the first hierarchical folder structure, and wherein at least one of the relational data acquiring unit, the attribute appending unit, the selection unit, and the conversion unit includes at least one of a memory and a processor.

11. The data management apparatus according to claim 10, wherein the item included in the selected relational data piece is included in the first hierarchical folder structure in which a single item can be registered in multiple parent folders, and wherein the converted item is in the second hierarchical folder structure in which a single item can be registered in only a single parent folder.

* * * * *